United States Patent [19]

Kamiyama et al.

[11] Patent Number: 5,490,964
[45] Date of Patent: Feb. 13, 1996

[54] METHOD AND DEVICE FOR REPAIRING A TUBULAR CONDUIT

[75] Inventors: Takao Kamiyama, Hiratsuka; Yasuhiro Yokoshima, Ibaraki; Shigeru Endoh, Kasukabe, all of Japan

[73] Assignees: Shonan Gosei-Jushi Seisakusho K.K.; Kanagawa, Yokoshima & Company; GET, Inc., both of Ibaraki; all of Japan

[21] Appl. No.: 212,778

[22] Filed: Mar. 15, 1994

[30] Foreign Application Priority Data

Apr. 13, 1993 [JP] Japan ..................... 5-086456

[51] Int. Cl.6 ............................................... B29C 63/36
[52] U.S. Cl. ...................... 264/36; 138/97; 138/98; 156/287; 156/294; 264/516; 264/269; 425/503
[58] Field of Search ............................ 264/36, 516, 269, 264/35; 156/287, 294; 138/97, 98; 425/503

[56] References Cited

U.S. PATENT DOCUMENTS

| | | | |
|---|---|---|---|
| 5,167,901 | 12/1992 | Driver et al. | 264/269 |
| 5,225,121 | 7/1993 | Yokoshima | 156/294 |
| 5,358,359 | 10/1994 | Long, Jr. | 156/294 |

FOREIGN PATENT DOCUMENTS

| | | | |
|---|---|---|---|
| 63-254025 | 10/1988 | Japan | 264/269 |
| 1-182025 | 7/1989 | Japan | 264/269 |
| 5-92485 | 4/1993 | Japan | 264/269 |
| WO91/16568 | 10/1991 | WIPO | 138/97 |

*Primary Examiner*—Mathieu D. Vargot
*Attorney, Agent, or Firm*—Whitham, Curtis, Whitham & McGinn

[57] ABSTRACT

A method for repairing a tubular conduit by lining the inner wall of the tubular conduit with a tubular liner bag impregnated with thermosetting liquid resin, having the steps of: (a) everting the tubular liner bag in the tubular conduit; (b) closing the open end of the tubular liner bag with a stationary lid thereby forming a closed space inside the tubular liner bag and the lid; (c) inserting a heat-resistive hose into the closed space through the lid; (d) inflating the tubular liner bag by charging a pressurized fluid into the closed space; and (e) supplying hot water via the heat-resistive hose to thereby heat and harden the liner bag; wherein the heat-resistive hose is slidably inserted through the lid, and is connected to the lid via a flexible inflatable sealing device such that when the pressurized fluid is charged into the closed space the sealing device is pressed to inflate externally from the lid thereby forcing the heat-resistive hose to slide externally.

6 Claims, 3 Drawing Sheets

5,490,964

METHOD AND DEVICE FOR REPAIRING A TUBULAR CONDUIT

BACKGROUND OF THE INVENTION

1. Field of the Invention

The present invention relates to a method for repairing a tubular conduit by lining the inner wall of the tubular conduit with a tubular liner bag.

2. Description of the Prior Art

When an underground tubular conduit, such as pipelines and passageways, becomes defective or too old to perform reliably, the tubular conduit is repaired and rehabilitated without digging the earth to expose the tubular conduit and disassembling the sections of the tubular conduit. This non-digging method of repairing an underground conduit has been known and practiced commonly in the field of civil engineering. Typically, the method is disclosed by Japanese Provisional Patent Publication (Kokai) Sho 60-242038.

According to this publication, this method of conduit repair comprises inserting a sufficiently long tubular flexible liner bag into the tubular conduit to be repaired by means of a pressurized fluid, like air and water. The tubular liner bag is made of a flexible resin-absorbent material impregnated with a thermosetting liquid resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old tubular conduit in a manner such that the wide-opened end of the liner completely and fixedly covers and closes the conduit end; a portion of the liner is pushed into the conduit; then, the pressurized fluid is applied to the said portion of the tubular liner such that the fluid urges the tubular liner to enter the conduit. Since one end of the tubular liner is hooked at the end of the conduit, it remains there while the rest of the flexible liner bag is turned inside out as it proceeds deeper in the conduit, and this manner of insertion is exactly what is meant by the term "everting" as used above and it shall mean so throughout this application document. When the entire length of the tubular liner bag is everted (i.e., turned inside out) into the conduit, the control rope holds the closed end of the tubular liner bag to thereby control the length of the tubular liner in the conduit. Then, the everted tubular liner is pressed against the inner wall of the conduit by the said pressurized fluid, and the tubular flexible liner is hardened as the thermosetting liquid resin impregnated in the liner is heated, which is effected by heating the fluid filling the tubular liner bag by means of a hot steam, etc. It is thus possible to line the inside wall of the defective or old conduit with a rigid liner without digging the ground and disassembling the conduit sections.

However, in this conventional method, when the fluid used is a liquid such as water, it is necessary to heat the entire body of the liquid contained in the reversed tubular liner bag, and this consumes a considerable amount of fuel or electricity as well as time, especially when the diameter or the length of the conduit to be repaired is large. Also, since this conventional method uses a large volume of the liquid, it requires a large-sized boiler, hot water pump, heating and circulation installation, etc. Thus, the preparation as well as the operation for the conduit repair takes many hours and large cost. Consequently, with this conventional heating method, the operation efficiency is poor and the operation cost is high.

In order to overcome this problem, one of the present inventors contrived an improved method for repairing a tubular conduit, which is described in a patent application of U.S. Ser. No. 07/776,046 and will be explained briefly as follows, with reference to FIG. 3. Thus, according to this formerly proposed invention, an everted tubular liner bag 102 impregnated with a thermosetting liquid resin was inflated inside a tubular conduit 101 by means of air pressure to fit closely to the inner wall of the conduit 101; then, a heat-resistive sprinkler hose 107 which had been inserted in the tubular liner bag 102 was supplied with hot water so that the hot water was sprinkled onto the tubular liner bag 102 to thereby harden the thermosetting resin impregnated therein. Thus, in this proposed method, the tubular liner bag 102 pressed against the inner wall of the conduit 101 was uniformly heated by the hot water sprinkled on it by the sprinkler hose 107 whereby the thermosetting resin impregnated in the tubular liner bag was caused to uniformly harden, so that the heat energy required was only that used to heat up the water for sprinkling and not the bulky volume of the water that would have filled the tubular liner bag 102 in the case of the conventional method, and since the volume of the water used was much smaller, the boiler 122, the hot water pump 121, and other heating and circulation devices could be ones of small sizes and low capacities, and the repair of the conduit 101 could be accomplished in a relatively short time and at a reduced cost even when the conduit 101 had a large diameter or a large length.

(Problems the Invention seeks to solve)

Now, in the above improved method, the sprinkler hose 107 was directly fastened to one of guide tubes 105, which were formed integrally with a lid member 103b of an anchor frame 103, as shown in FIG. 3, so that the length of the sprinkler hose inside the tubular liner bag 102 was not controllable. Therefore, it was necessary to predetermine the length of the sprinkler hose 107 in precise relation to the length of the tubular conduit 101, because when the sprinkler hose 107 was too long, it could be sucked by a suction hose 109 and plug the latter, or it could bend acutely to stop the flow of the hot water therein whereby the proper sprinkling would not occur. On the other hand, when the sprinkler hose 107 was too short, the head portion of the tubular liner bag 102 could not be sprinkled with hot water. However, it was in practice impossible to measure the length of an underground conduit with high precision, and furthermore, the sprinkler hose 107 would necessarily expand and its length would increase when hot water was passed in it. Therefore, it was very difficult to predetermine the optimum length of the sprinkler hose 107 to be used, and in most instances, the length is selected to be greater than an apparently sufficient value to be on the safer side. Also, with the conventional methods, it was necessary to tailor-make a sprinkler hose 107 of a suitable length each time a conduit 101 of a different length was repaired, and this was very uneconomical.

The present invention was contrived in view of the above problems, and it is, therefore, an object of the invention to provide a new method for repairing a tubular conduit which method is so contrived that the length of the sprinkler hose inside the tubular liner bag can be controlled to an optimum value such that a proper sprinkling of hot water occurs throughout the length of the tubular liner bag so that the repair work becomes more economical and effective.

SUMMARY OF THE INVENTION (Means to solve the Problems)

In order to attain the above and other objects of the invention, there is provided an improved method for repairing a tubular conduit by lining the inner wall of the tubular conduit with a tubular liner bag impregnated with thermosetting liquid resin, comprising the steps of: (a) everting the tubular liner bag in the tubular conduit; (b) closing the open end of the tubular liner bag with a stationary lid means thereby forming a closed space inside the tubular liner bag and the lid means; (c) inserting a heat-resistive hose into said closed space through said lid means; (d) inflating said tubular liner bag by charging a pressurized fluid into the closed space; and (e) supplying hot water via said heat-resistive hose to thereby heat and harden said liner bag; said method being characterized by that said heat-resistive hose is slidably inserted through said lid means, and is connected to said lid means via a flexible inflatable sealing device such that when said pressurized fluid is charged into said closed space said sealing device is pressed to inflate externally from said lid means thereby forcing said heat-resistive hose to slide externally.

In a preferred embodiment, said flexible inflatable sealing device is a tube with one end connected to the outer surface of said heat-resistive hose and the other end everted and anchored to said lid means.

It is also preferable if said heat-resistive hose is a sprinkler hose and as hot water is sprinkled through this hose, the hose is turned about its center axis right and left alternately.

This invention also provides a flexible inflatable sealing device used in the method of the invention as the sealant between said heat-resistive hose and said lid means: this sealing device has its one part connected to said heat-resistive hose and another part connected to said lid means, and said sealing device is designed such that when said pressurized fluid is charged into said closed space said sealing device is inflated externally from said stationary lid means.

(Effects of the Invention)

According to the invention, the heat-resistive hose is connected to the stationary lid means via the flexible inflatable sealing device, so that even when an excessive length of the heat-resistive hose is inserted into the closed space such that the heat-resistive hose is bent and lax, it is possible to pull out the hose from the closed space S until the hose inside the closed space S becomes fairly tight, by supplying pressurized air, for example, into the closed space to thereby force the flexible inflatable sealing device to inflate externally (evert) and pull the hose upward; as the result, the bending and lax of the hose is completely removed and a suitable supply of hot water is achieved and the thermosetting liquid in the tubular liner bag is uniformly hardened, and the tubular conduit is repaired well.

Also, in the case of using a sprinkler hose, the heat-resistive sprinkler hose is supported flexibly relative to the stationary lid means by means of the flexible inflatable sealing device, so that it is possible to turn the hose about its axis by virtue of the flexibility of the sealing device; therefore, by turning the hose right and left alternately, it is possible to swing the hot water streams shot out from the sprinkler hose. As the result, the tubular liner bag is hardened uniformly not only lengthwise but also circumferentially Thus, the present invention attains the above-mentioned objects. Further scope of applicability of the present invention will become apparent from the detailed description given hereinafter. However, it should be understood that the detailed description and specific examples, while indicating preferred embodiments of the invention are given by way of illustration only, since various changes and modifications within the spirit and scope of the invention will become apparent to those skilled in the art from this detailed description. The present invention will become more precisely understood from the detailed description given hereinbelow and the accompanying drawings which are given by way of illustration only, and thus are not limitative of the present invention.

DETAILED DESCRIPTION OF THE INVENTION (Embodiments)

Next, an embodiment of the invention will be described with reference to the attached drawings.

Figure 1:
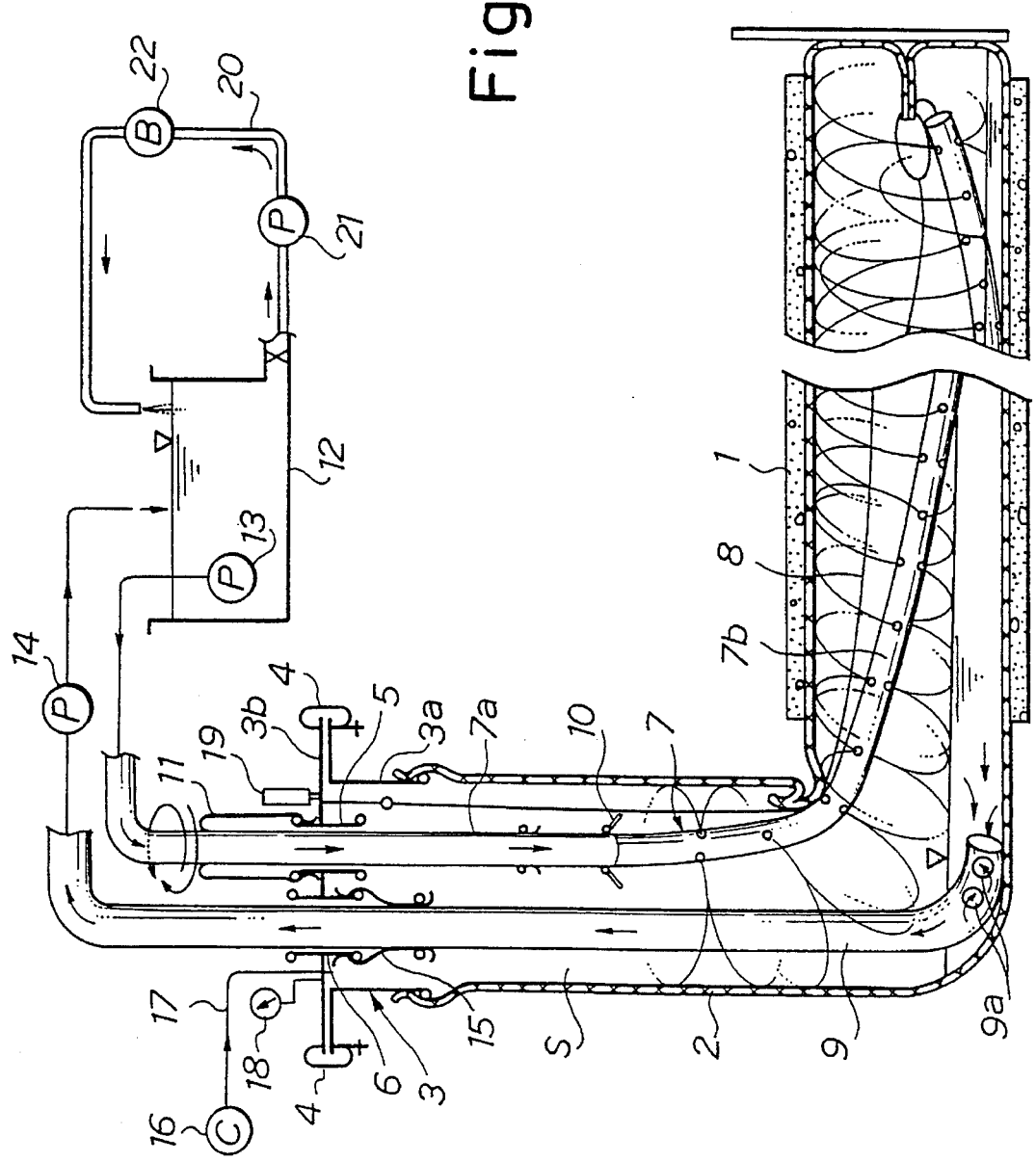
FIG. 1 is a sectional view of a site in which a conduit is repaired, useful to explain the method of the invention.
Figure 2:
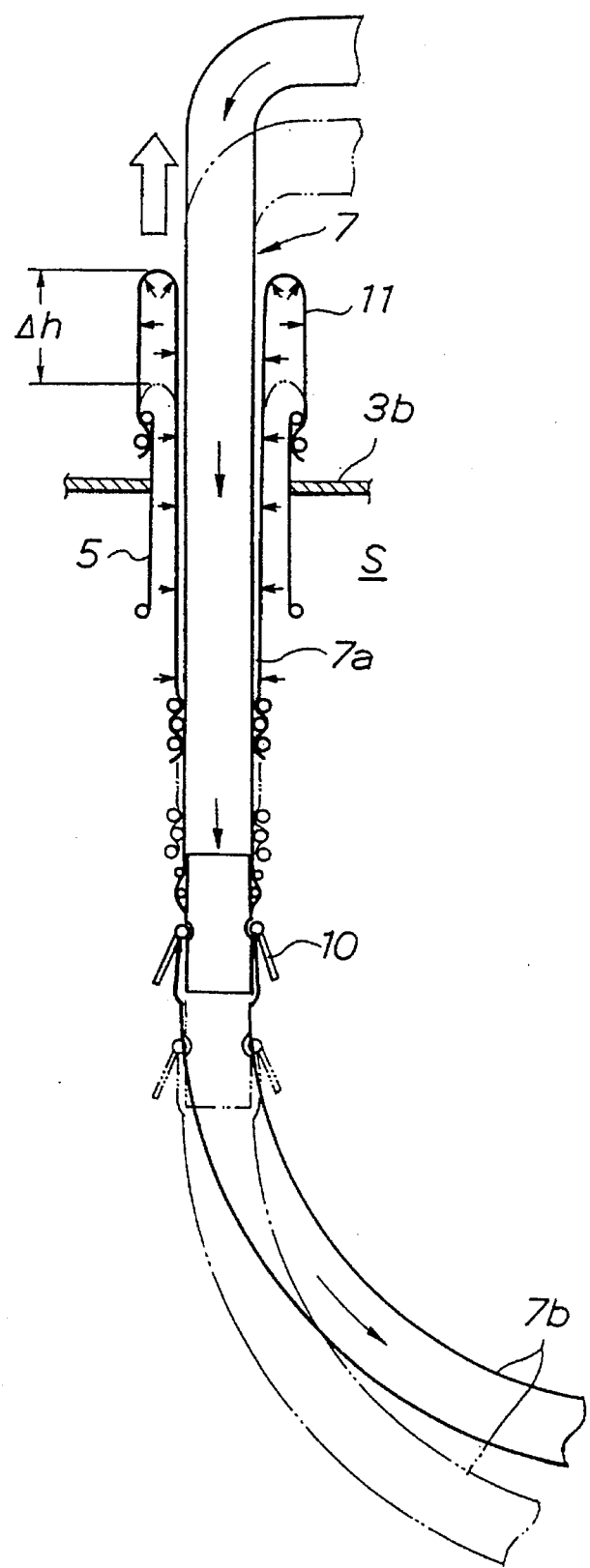
FIG. 2 is a sectional view useful to explain the movement of the sprinkler hose.
Figure 3:
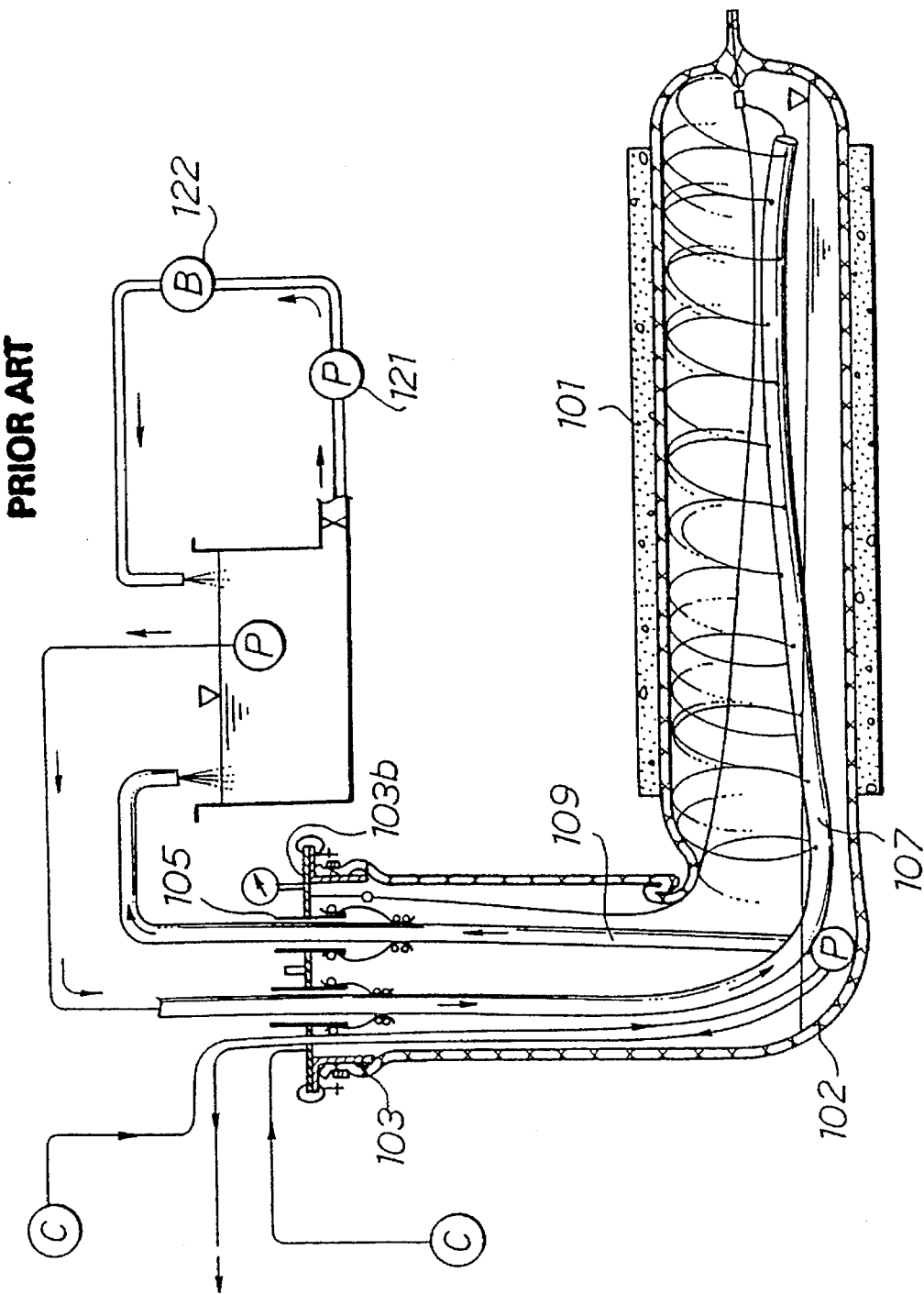
FIG. 3 is a sectional view similar as FIG. 1, useful to explain a conventional method.

FIG. 1 is a sectional view of a site in which a conduit is repaired, useful to explain the method of the invention; FIG. 2 is a sectional view useful to explain the movement of the sprinkler hose.

With reference to FIG. 1, a tubular liner bag 2 soaked with thermosetting liquid resin is inserted by eversion into a tubular conduit 1 laid under the ground.

Incidentally, this tubular liner bag 2 is prepared in the following manner. A rectangular nonwoven resin-absorbable fabric of polyester felt is sewed into a tubular shape. This tubular pipe liner is then impregnated with the thermosetting liquid resin and is coated with an air- and water-tight film which hermetically covers at least the outer surface of the tubular pipe liner. This hermetic film may be made of polyurethane, polyethylene or any other plastic material that forms an air- and water-tight film. When this tubular liner bag 2 is everted the hermetic film becomes inner side of the bag 2.

As shown in FIG. 1, the tubular liner bag 2 inserted in the conduit 1 has its one end closed by sewing; the other end of the tubular liner bag 2 is gaped wide and fastened about the lower periphery of a cylindrical part 3a of an anchor frame 3, which is installed on the ground. Incidentally, the upper face of the cylindrical part 3a of the anchor frame 3 is covered up with a lid member 3b, which is fixed on the anchor frame 3 by means of a plurality of G clamps 4, and cylindrical guide tubes 5, 6 are formed integrally with and through the lid member 3b.

Thus, in the tubular lining bag 2 is formed a closed space S surrounded by the tubular liner bag 2 and the anchor frame 3, and, as shown in FIG. 1, when the tubular liner bag 2 has been everted into the tubular conduit 1, a heat-resistive sprinkler hose 7 and a belt-type rope 8, whose ends are connected to the front end of the tubular liner bag 2, are drawn inside the closed space S, and at the same time, a suction hose 9 is lowered to reach the floor of the everted tubular liner bag 2. The belt-type rope 8 is intended to smooth out the bend portion of the tubular liner bag 2 at which the bag 2 tends to fold itself. The other end of the belt-type rope 8 is connected to the lid member 3b.

The sprinkler hose 7 consists of an upper hose 7a, which penetrates through the lid member 3b at the guide tube 5 and is disposed in the tubular liner bag 2, and a flexible plastic hose 7b, which is connected to the lower end of the upper hose 7a by means of one-touch joints 10 and is made with a plurality of holes at appropriate intervals. These holes are of such sizes that they enable the pressurized hot water in the hose 7 to shoot out powerfully enough to hit the inner walls of the liner bag 2.

Next, the sealing structure of that part of the anchor frame 3 where the upper hose 7a of the sprinkler hose 7 penetrates the anchor frame 3 is described, with reference to FIG. 2.

That part of the anchor frame 3 where the upper hose 7a penetrates is hermetically sealed by means of a flexible air-tight tube 11.

More particularly, the upper hose 7a penetrates the air-tight tube 11, and the lower end of the latter 11 is attached to the outer surface of the upper hose 7a. Also, that part of the flexible air-tight tube 11 which is disposed outside the anchor frame 3 (outside the closed space S) is turned inside out and its end is fastened to the outer surface of the upper end of the guide tube 5. Accordingly, the upper hose 7a is hermetically and flexibly supported by the stationary guide tube 5 by means of the flexible air-tight tube 11.

As shown in FIG. 1, the upper end of the upper hose 7a is connected to a hot water pump 13 provided in a water tank 12 installed on the ground.

The suction hose 9 has its lower open end lying on the floor of the closed space S in the tubular liner bag 2, as shown in FIG. 1, and the other end extends outside the closed space S through the guide tube 6, passes through a hot water pump 14 installed on the ground, and is disposed to open above the water tank 12. Incidentally, the guide tube 6 is provided with a flexible valve 15, which resiliently attaches itself to the suction hose 9, so as to maintain the airtightness of the closed space S. The lower end portion of the suction hose 9 which lies on the floor of the closed space S is formed with a plurality of side holes 9a as the supplementary suction holes.

Also installed on the ground is an air compressor 16 for supplying compressed air to the closed space S by way of a conduit pipe 17, which extends from the compressor 16 and is connected to the lid member 3b to open into the closed space S. Incidentally, the lid member 3b is provided with a pressure gauge 18 and a relief valve 19.

A hot water pipe 20 extends from the bottom of the water tank 12, passes through a hot water pump 21 and a boiler 22, and opens above the water tank 12, so that the pipe 20 constitutes a water circulation system.

When the compressor 16 is driven to supply compressed air to the closed space S via the pipe 17, the internal pressure of the closed space S is increased, and the tubular liner bag 2 is inflated by the air pressure to pressed against the inner walls of the tubular conduit 1, as shown in FIG. 1. At the same time, the flexible air-tight tube 11 is everted as it is pressed by the increasing internal pressure of the closed space S and rises together with the sprinkler hose 7 until the latter is fairly tight and stops yielding. Thus, in the case of FIG. 2, the flexible air-tight tube 11 has everted by a distance of $\Delta h$ rising from the position drawn in broken line to the position drawn in solid line, thereby pulling the sprinkler hose 7 upward by a height of $\Delta h$ from the broken line position to the solid line position. As the result, even when an excessive amount of the sprinkler hose 7 has entered into the closed space S, it is possible to draw back the sprinkler hose 7 from the closed space S until the sprinkler hose 7 becomes fairly tight inside the closed space S, as shown in FIG. 1. Incidentally, the internal pressure of the closed space S is prevented from rising beyond a predetermined value by virtue of the relief valve 19.

Things being the way they are, the hot water pump 13 in the water tank 12 is driven to cause the hot water in the water tank 12 to rush in the hot water hose 7 in the direction of the arrows shown in FIG. 1, and the hot water shoots out from the holes punctured through the hose 7 (plastic hose 7b). The inner wall of the tubular liner bag 2 is thus showered with the hot water, and the thermosetting resin impregnated in the tubular liner bag 2 is heated and prompted to undergo an exothermic reaction to harden, whereby the inner wall of the conduit 1 is uniformly lined with the hardened lining material 2.

Incidentally, the hot water that has heated the tubular liner bag 2 falls and gathers on the floor of the liner bag 2 in the closed space S, as shown in FIG. 1. As the hot water pump 14 is driven, this lukewarm water is sucked up through the suction hose 9 and sent back to the water tank 12. Therefore, the water is recirculated within the closed system.

The hot water in the water tank 12 is drawn to the boiler 22 by means of the hot water pump 21 to be heated to a predetermined temperature, and returned to the water tank 12. Since, in this manner, the hot water in the water tank 12 is circulated in this heating system through the hot water pipe 20 over and over again the temperature of the hot water in the tank 12 is maintained at a value suitable for hardening the thermosetting liquid resin in the tubular liner bag 2.

In this embodiment of the invention, the sprinkler hose 7 is hermetically and flexibly supported by the stationary guide tube 5 by means of the flexible air-tight tube 11, so that even when such an excessive length of the sprinkler hose 7 is inside the closed space S that the sprinkler hose 7 is bent and lax and liable to choke itself or be sucked by the suction hose 9 to plug it, it is possible to pull back the sprinkler hose 7 from the closed space S until the sprinkler hose 7 inside the closed space S becomes fairly tight by supplying pressurized air into the closed space S to thereby force the flexible air-tight tube 11 to evert and draw up the sprinkler hose 7. As the result, the bending of the sprinkler hose 7 is completely removed and a suitable sprinkling of hot water is achieved and the thermosetting liquid in the tubular liner bag 2 is uniformly hardened, and the tubular conduit 1 is repaired well.

Also, the sprinkler hose 7 is supported flexibly relative to the anchor frame 3 by means of the flexible air-tight tube 11, so that it is possible to turn the sprinkler hose 7 about its axis by virtue of the flexibility of the air-tight tube 11; therefore, by turning the sprinkler hose 7 right and left alternately, it is possible to swing the hot water streams shot out from the sprinkler hose 7. As the result, the tubular liner bag 2 is hardened uniformly not only lengthwise but also circumferentially.

Both ends of the tubular liner bag 2 are cut off at the ends of the tubular conduit 1 after removing all the devices.

In this embodiment of the invention, it is apparent that all the effects attributable to the use of hot water showering (namely, energy saving, reduction of the sizes of the heating and circulation facilities such as water tank 12, hot water pump 21, and boiler 22, and the time and cost saving even when a conduit having a large diameter or length is repaired) are attained in addition to the above effects.

(Result of the Invention)

While the invention has been described in its preferred embodiment, it is to be understood that modifications will occur to those skilled in the art without departing from the spirit of the invention. For instance, in this embodiment only compressed air is used to pressurized the closed space S and inflate the tubular liner bag 2 in the tubular conduit 1, it is possible to use water in addition or in place of compressed air to inflate the tubular liner bag 2. Also, although in the above embodiment, the invention is practiced in the case where the hot water sprinkling (U.S. Ser. No. 07/776,046) is employed to heat the thermosetting resin, it is possible to apply the same method and device of the present invention in a case where the thermosetting resin is heated by the hot water supplied by a hose to circulate in the closed space.

What is claimed is:

1. A method for repairing a tubular conduit by lining the inner wall of the tubular conduit with a tubular liner bag impregnated with thermosetting liquid resin, comprising the steps of: (a) everting the tubular liner bag in the tubular conduit; (b) inserting a heat-resistive hose into said tubular liner bag; (c) closing the open end of the tubular liner bag with a stationary lid means thereby forming a closed space inside the tubular liner bag and the lid means, said heat-resistive hose being slidably supported through said lid means, and connected to said lid means via a flexible inflatable sealing device such that when a pressurized fluid is charged into said closed space said sealing device is pressed to inflate externally from said lid means forcing said heat-resistive hose to slide externally, wherein said flexible inflatable sealing device comprises a tube having one end connected to the outer surface of said heat-resistive hose and another end everted and anchored to said lid means; (d) inflatting said tubular liner bag by charging said pressurized fluid into the closed space; and (e) supplying hot, water via said heat-resistive hose to thereby heat and harden said liner bag.

2. The method as recited in claim 1, wherein said heat-resistive hose is a sprinkler hose and as hot water is sprinkler through said sprinkle hose, said sprinkler is turned about its center axis right and left alternately.

3. A method for repairing a tubular conduit by lining the inner wall of said tubular conduit with a tubular liner bag impregnated with thermosetting liquid resin, comprising the steps of:

(a) preparing said tubular liner bag by connecting an end of a heat-resistive hose to a closed end of said tubular liner bag, said tubular liner bag having an opposite open end;

(b) everting said tubular liner bag into said tubular conduit;

(c) slidably supporting said heat-resistive hose via a flexible inflatable sealing tube in a manner wherein a lower end of said sealing tube is attached to an outer surface of said heat-resistive hose and an upper end of said sealing tube is fastened to stationary lid means attachable to said open end of said tubular liner bag;

(d) closing said open end of said everted tubular liner bag with said stationary lid means to form a closed space defined inside said tubular liner bag and said stationary lid means;

(e) inflating said tubular liner bag by charging a pressurized fluid into said closed space;

(f) evening said sealing tube upward relative to said stationary lid means; and (g) supplying heated water via said heat-resistive hose in a manner effective to heat and harden said evened tubular liner bag.

4. The method of claim 3, wherein said upper end of said sealing tube is fastened to said stationary lid means at a guide tube in said stationary lid means.

5. The method of claim 3, wherein said heat-resistive hose is a sprinkler hose and as hot water is sprinkled through said sprinkler hose, said sprinkler hose is turned about its center axis right and left alternately.

6. A flexible inflatable sealing device for repairing a tubular conduit by lining the inner wall of the tubular conduit with a tubular liner bag impregnated with thermosetting liquid resin, comprising a sealing tube for sealing a heat-resistive hose and a lid means, wherein said heat-resistive hose is inserted through and slidably attached to said lid means via said sealing tube in a manner wherein a lower end of said sealing tube is attached to an outer surface of said heat-resistive hose and an upper end of said sealing tube is fastened to said lid means and evertable upward relative to said lid means, and said heat-resistive hose is slidable upward and externally relative to said lid means upon inflation of said sealing device.

* * * * *